United States Patent
Li

(10) Patent No.: US 7,305,120 B2
(45) Date of Patent: Dec. 4, 2007

(54) OPTIMIZED METHOD OF SCANNING AND MEASURING A THREE-DIMENSIONAL OBJECT

(75) Inventor: Wen-Kuei Li, Taipei Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 463 days.

(21) Appl. No.: 10/908,115

(22) Filed: Apr. 28, 2005

(65) Prior Publication Data

US 2006/0245638 A1    Nov. 2, 2006

(51) Int. Cl.
*G06K 9/00* (2006.01)
*H04N 1/04* (2006.01)
*G06T 15/00* (2006.01)

(52) U.S. Cl. .................. 382/154; 358/493; 345/419
(58) Field of Classification Search ........ 382/130–132, 382/154, 285; 358/474, 493, 494; 345/419–427, 345/653, 664, 679
See application file for complete search history.

(56) References Cited

U.S. PATENT DOCUMENTS

| | | | | |
|---|---|---|---|---|
| 5,104,227 | A * | 4/1992 | Uesugi et al. | 356/607 |
| 7,020,325 | B2 * | 3/2006 | Park | 382/154 |
| 2003/0068079 | A1 * | 4/2003 | Park | 382/154 |
| 2004/0222987 | A1 * | 11/2004 | Chang et al. | 345/419 |
| 2005/0180623 | A1 * | 8/2005 | Mueller et al. | 382/154 |

* cited by examiner

*Primary Examiner*—Brian Le
(74) *Attorney, Agent, or Firm*—Winston Hsu

(57) ABSTRACT

According to the claimed invention, a method of scanning and measuring surfaces of a three-dimensional object is disclosed. The method includes (a) scanning the object from one or more different angles with a scanning device; (b) identifying unscanned surfaces of the object that have not yet been scanned by the scanning device; (c) estimating surface areas of the unscanned surfaces; (d) comparing the surface areas of the unscanned surfaces for selecting an unscanned surface having the largest surface area; (e) rotating the object with respect to the scanning device such that the scanning device is pointing towards the unscanned surface with the largest surface area; (f) scanning the object with the scanning device for scanning the unscanned surface with the largest surface area; and (g) repeating steps (b) to (f) until all required surfaces of the object have been scanned.

6 Claims, 6 Drawing Sheets

OPTIMIZED METHOD OF SCANNING AND MEASURING A THREE-DIMENSIONAL OBJECT

BACKGROUND OF INVENTION

1. Field of the Invention

The present invention relates to three-dimensional measurements, and more specifically, to an efficient method of scanning and measuring a three-dimensional object.

2. Description of the Prior Art

Three-dimensional objects are often scanned in order to make a three-dimensional measurement of the scanned object. To accomplish this, a scanning device scans the scanned object from different angles. Unfortunately, unless the scanning device scans the scanned object from many different angles, some portions of the scanned object may not be scanned by the scanning device, and therefore, will not be measured. When scanning a scanned object for the first time, it is difficult to predict exactly how many times the scanned object will need to be scanned in order to scan every surface of the scanned object. Traditionally, the only way to ensure that every single surface of the scanned object is scanned is to scan the scanned object a great number of times, each time scanning the scanned object from a different angle.

Unfortunately, this is a very time consuming process, and some of the scanning operations are redundant and unnecessary. Thus, the industry is in need of a way to efficiently scan and measure a three-dimensional object.

SUMMARY OF INVENTION

It is therefore an objective of the claimed invention to provide a method for efficiently scanning and measuring a three-dimensional object in order to solve the above-mentioned problems.

According to the claimed invention, a method of scanning and measuring surfaces of a three-dimensional object is disclosed. The method comprises (a) scanning the object from one or more different angles with a scanning device; (b) identifying unscanned surfaces of the object that have not yet been scanned by the scanning device; (c) estimating surface areas of the unscanned surfaces; (d) shaping the block space exactly containing each of the unscanned surfaces; (e) comparing the surface areas of the unscanned surfaces for selecting an unscanned surface having the largest surface area or the largest block space; (f) dividing the selected block space into equal parts and comparing the two surface areas in parts; (g) rotating the object with respect to the scanning device in direction of larger surface area comparing in (f) such that the scanning device is pointing towards the reference point of the block space containing the largest surface area or having the largest volume; (h) scanning the object with the scanning device for scanning the unscanned surface with the largest surface area or the largest block space; and (i) repeating steps (b) to (h) until all required surfaces have been scanned.

It is an advantage of the claimed invention that the method selects the unscanned surface with the largest surface area to scan first for minimizing the number scanning operations required for fully scanning and measuring the scanned object. By focusing on the unscanned surfaces with the largest surface areas, the method is simple to implement and ensures that the scanned object is scanned quickly and efficiently.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
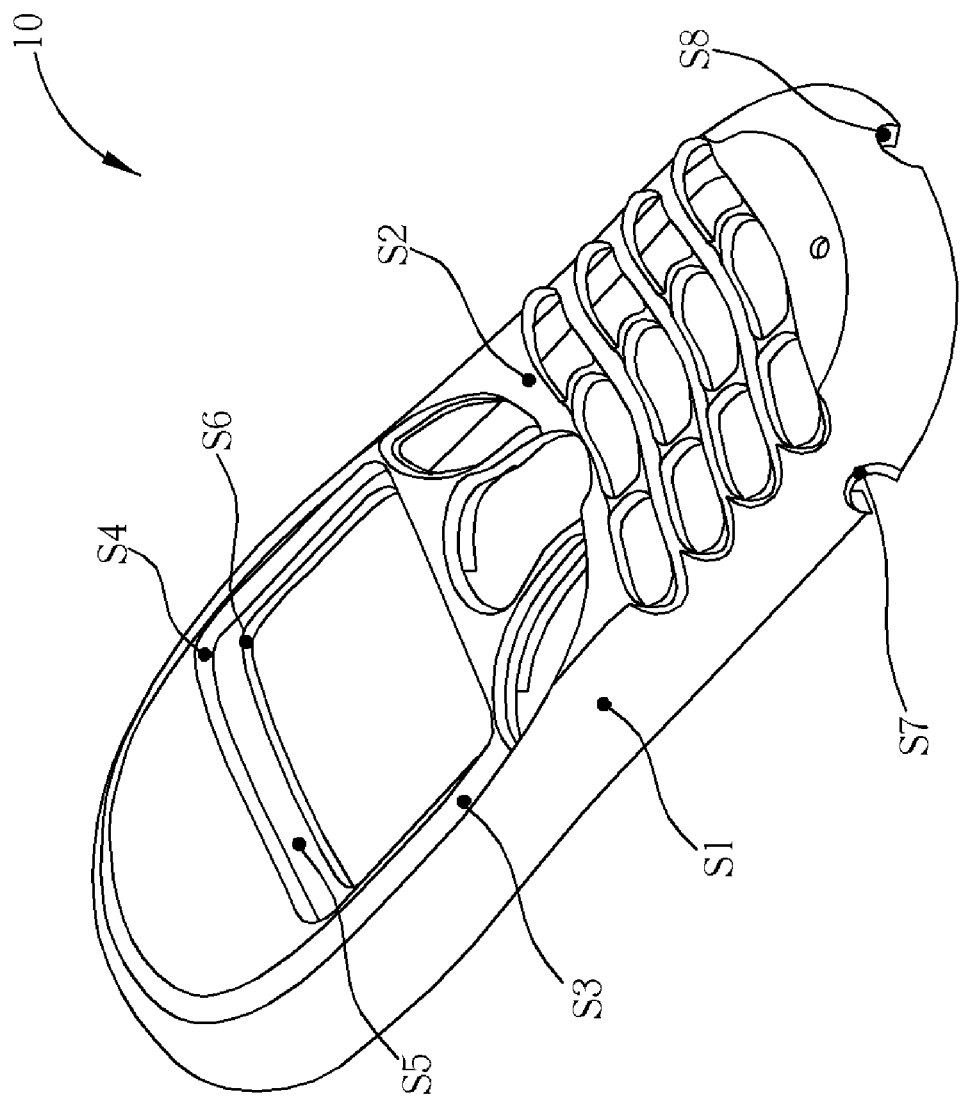
FIG. 1 is a diagram of a scanned object according to the present invention.

Please refer to FIG. 1. FIG. 1 is a diagram of a scanned object 10 according to the present invention. As an example, the scanned object 10 is illustrated as a mobile phone, but the present invention is suitable for scanning and measuring any three-dimensional object. For convenience, each of the major surfaces of the scanned object 10 is assigned a label. For example, FIG. 1 shows the surfaces S1 to S8. Please keep in mind that the assigning of labels can be done in a variety of ways, and is in fact an optional step.

Figure 2:
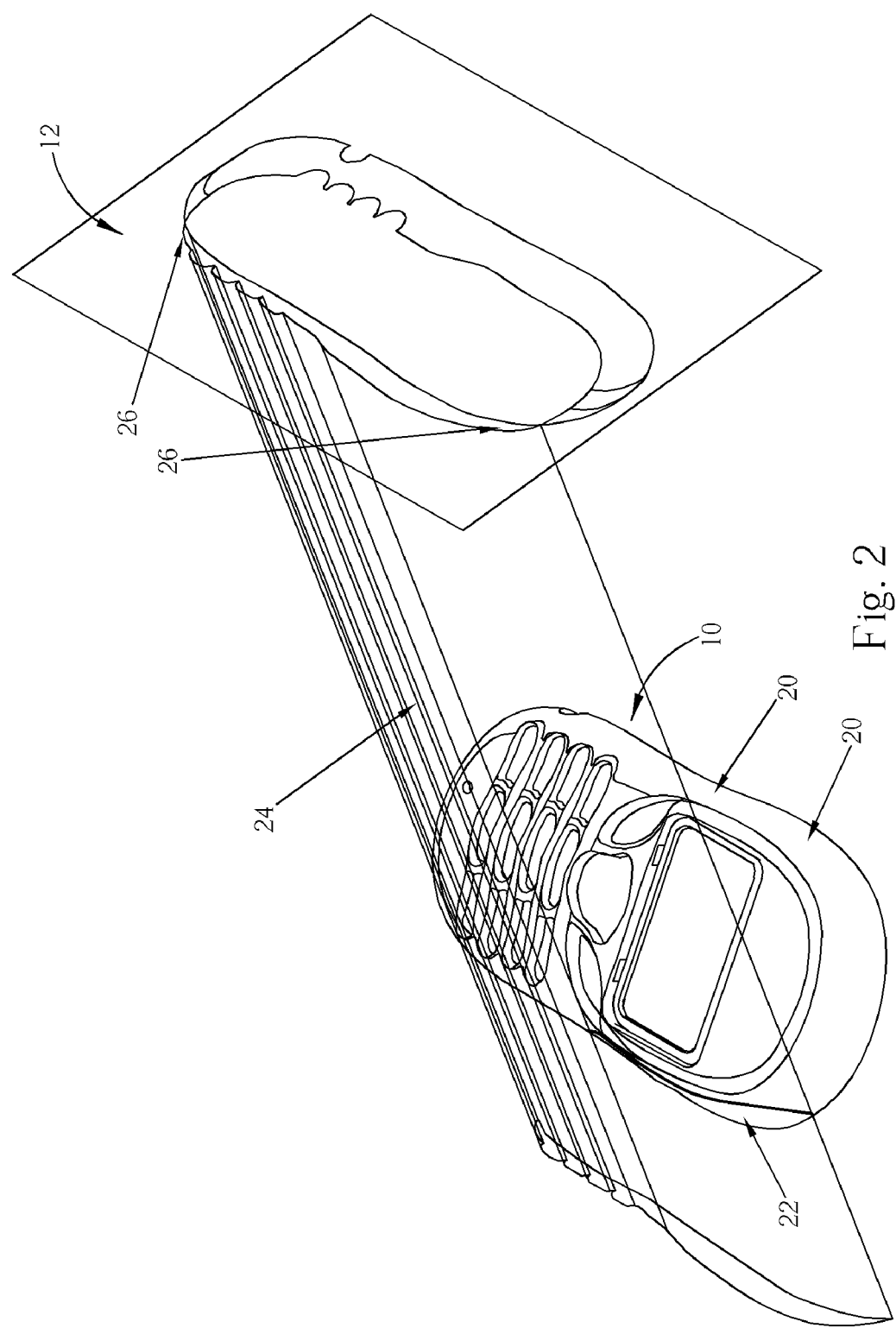
FIG. 2 illustrates scanning the scanned object with a scanning device.

Please refer to FIG. 2. FIG. 2 illustrates scanning the scanned object 10 with a scanning device 12. FIG. 2 illustrates light beams 24 that reflect from the scanned object 10 and projecting an image of the scanned object 10 on the scanning device 12. Section 20 of the scanned object 10 represents a side of the scanned object 10 that has been measured since there is nothing blocking the path between the section 20 and the scanning device 12. On the other hand, section 22 represents an unscanned surface of the 20 since a portion of the scanned object 10 blocks the path between the section 22 and the scanning device 12. The scanning device 12 captures an image of the scanned object 10, but the image contains areas 26 that may have not been scanned yet by the scanning device 12. Please keep in mind that a variety of devices may be used for scanning and measuring the scanned object 10. For example, a charge-coupled device (CCD) can be used, and non-optical scanning devices can also be used to scan and measure the scanned object 10.

Figure 3:
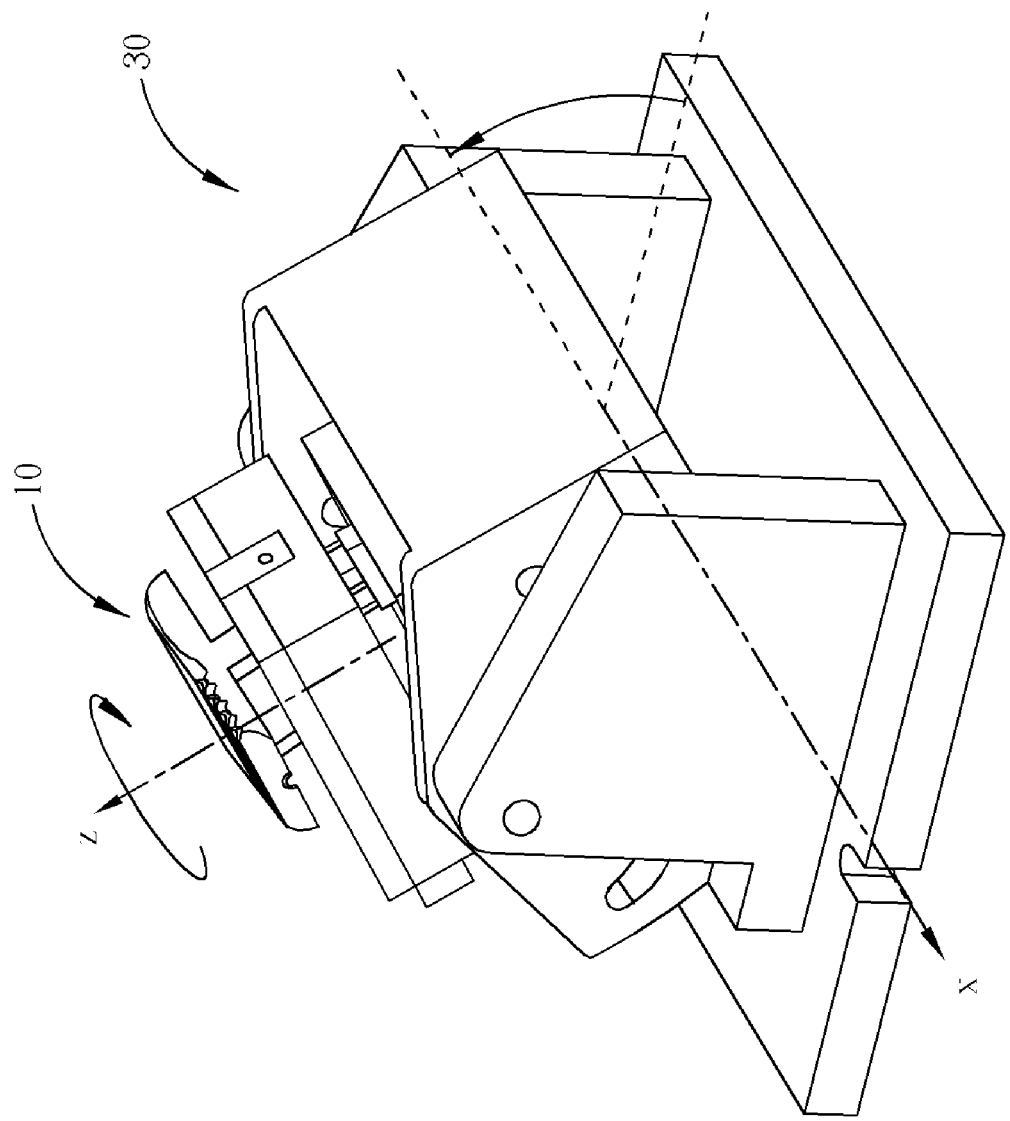
FIG. 3 is a diagram showing the scanned object fixed on a 2-DOF fixture.

Please refer to FIG. 3. FIG. 3 is a diagram showing the scanned object 10 fixed on a two degree of freedom (2-DOF) fixture 30. The fixture 30 can rotate the scanned object 10 in the x and z axes in order to scan the scanned object 10 from different angles. Although the disclosed embodiment uses a 2-DOF fixture in FIG. 3, the fixture might be put into practice using devices which offer more than 2-DOF rotation, depending on the scanning process in need.

Figure 4:
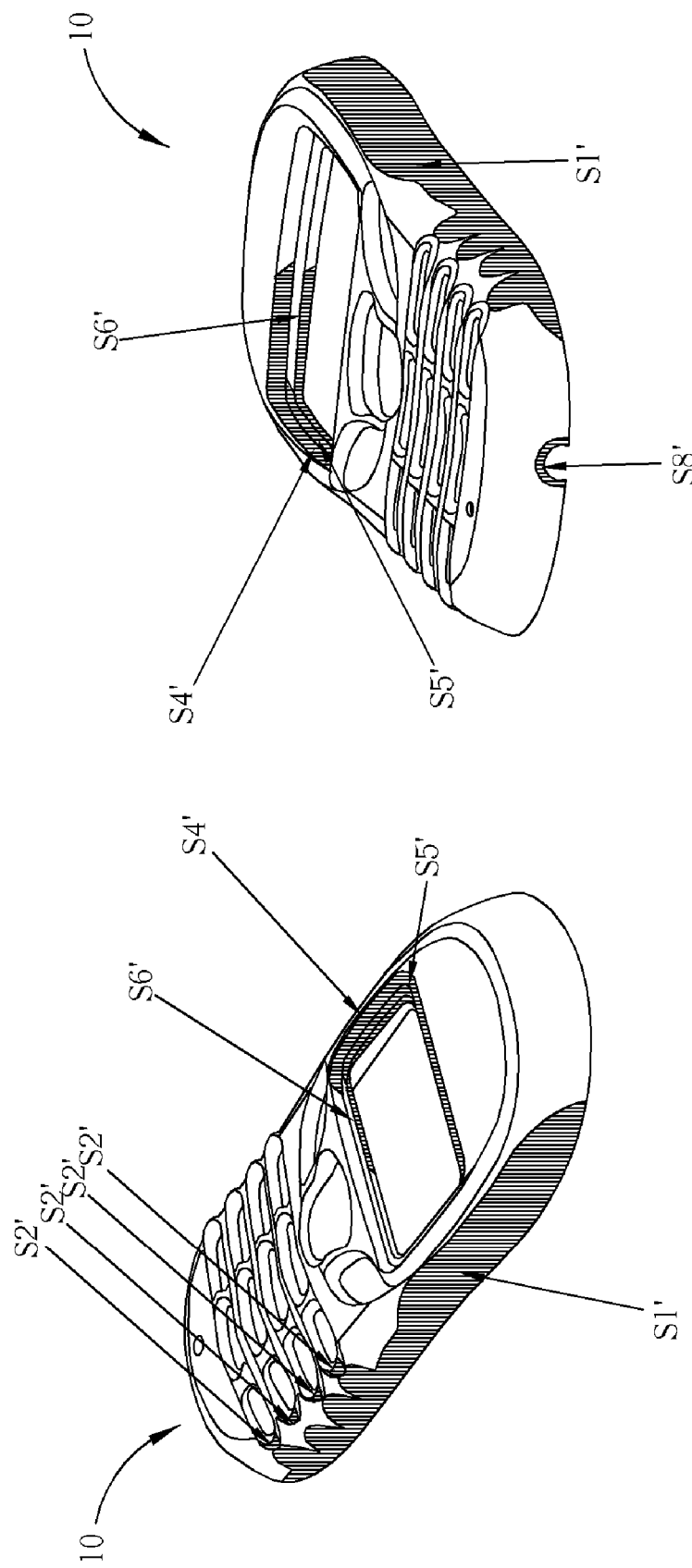
FIG. 4 is a diagram showing unscanned surfaces of the scanned object.

FIG. 4 is a diagram showing unscanned surfaces of the scanned object 10. After the scanned object 10 has been scanned once, there are still several unscanned surfaces S1', S2', S4', S5', S6', and S8' remaining on the scanned object 10. An image processing program can be used to produce an image of the scanned object 10 based on the scanning operations performed thus far, and to estimate the shapes of the unscanned surfaces S1', S2', S4', S5', S6', and S8'. The surface area of each of the unscanned surfaces S1', S2', S4', S5', S6', and S8' is then estimated to determine which portion of the scanned object 10 will be scanned next.

Figure 5:
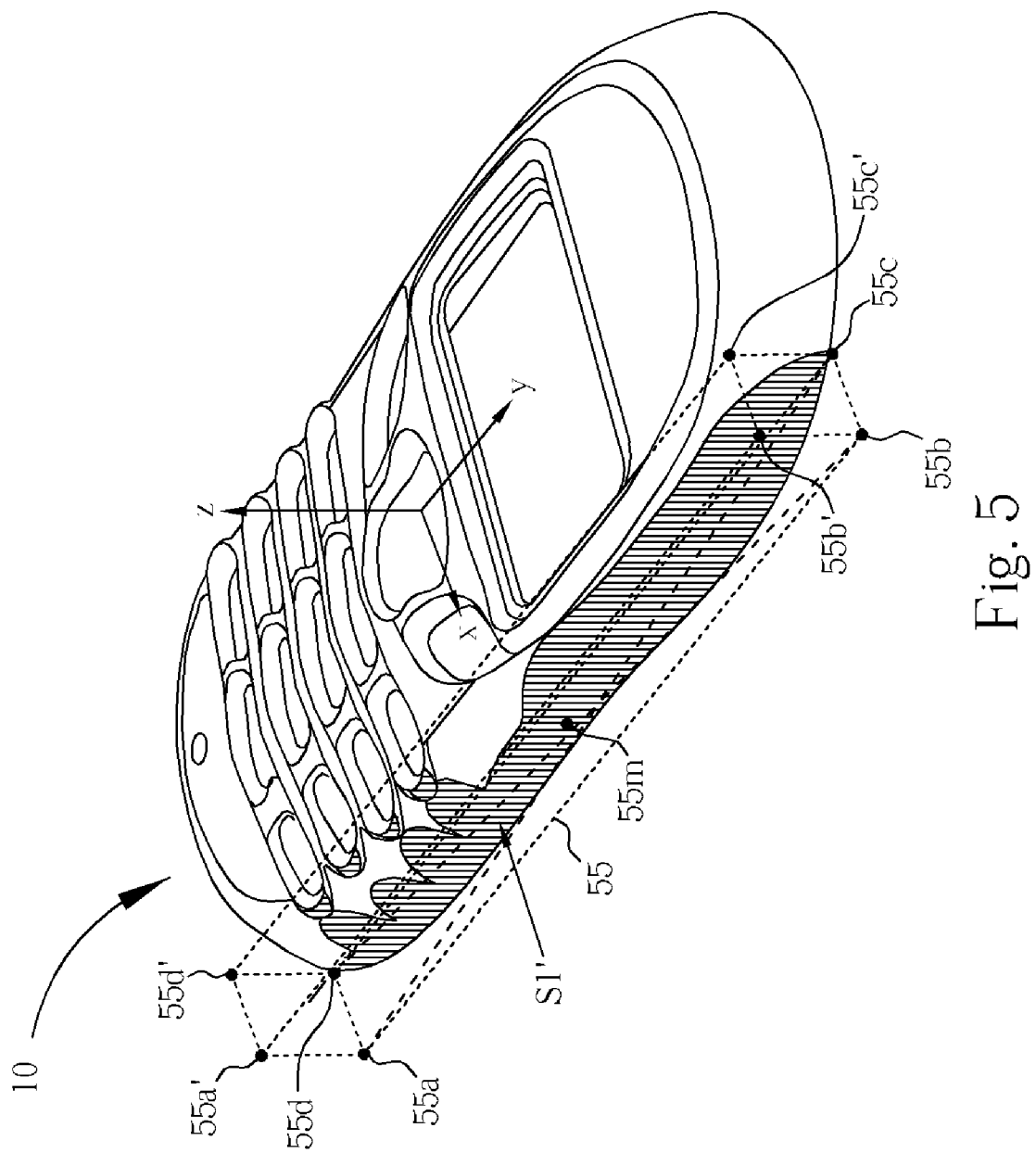
FIG. 5 is a diagram illustrating a reference point located in a virtual block exactly containing a largest unscanned surface of the scanned object.

In order to minimize the number of scanning operations needed to scan those unscanned surfaces and measure the scanned object 10, the unscanned surface having the largest surface area is chosen to be scanned next. If there are more than one unscanned surfaces that are the largest, then unscanned surface having the corresponding largest block space of the unscanned surface is chosen to be scanned next. Afterwards, the datum points of the unscanned surfaces are in need to be marked to position the unscanned surfaces during the scanning process. Please refer to FIG. 5. FIG. 5 is a diagram illustrating the calculation of a point 55m on a largest unscanned surface S1' of the scanned object 10 to use as a reference point for rotating the scanned object 10. A three-dimensional virtual block 55 is created such that the block 55 contains the largest unscanned surface S1' using the least amount of volume as possible. As shown, the block 55 contains the vertexes $55a(x_{min}, y_{min}, z_{min})$, $55b$, $55c(x_{max}, y_{max}, z_{min})$, $55d$, $55a'$, $55b'$, $55c'(x_{max}, y_{max}, z_{max})$, and $55d'$. Then, a point 55m is calculated such that the point 55m is near the center of the block 55. As an example, the point 55m shown in FIG. 5 is calculated to be located at the point $((x_{max}+x_{min})/2, (y_{max}+y_{min})/2, (x_{max}+z_{min})/2)$. This point 55m, which is approximately a midpoint of the block 55, is then used as a reference point for rotating the scanned object 10 with respect to the fixture 30. That is, the scanned object 10 is rotated such that the fixture 30 is pointing towards the point 55m. Please note that the equations given above for computing the location of the point 55m are used only as an example, and should be not taken as limiting. In general, using a point near the center of the block 55 should yield a point near the middle of the largest unscanned surface S1'.

Further more, the block space is divided into two equal parts; the position of the part containing the larger unscanned surface area is the next rotating direction of the scanning object. The fixture 30 will then rotate the scanned object 10 such that the largest unscanned surface points towards the scanning device 12. For instance, as shown in FIG. 3, the scanned object 10 can be rotated 180 degrees about the z-axis and rotated 37.6 degrees about the x-axis in the +z direction for rotating the scanned object 10 with respect to the scanning device 12.

Figure 6:
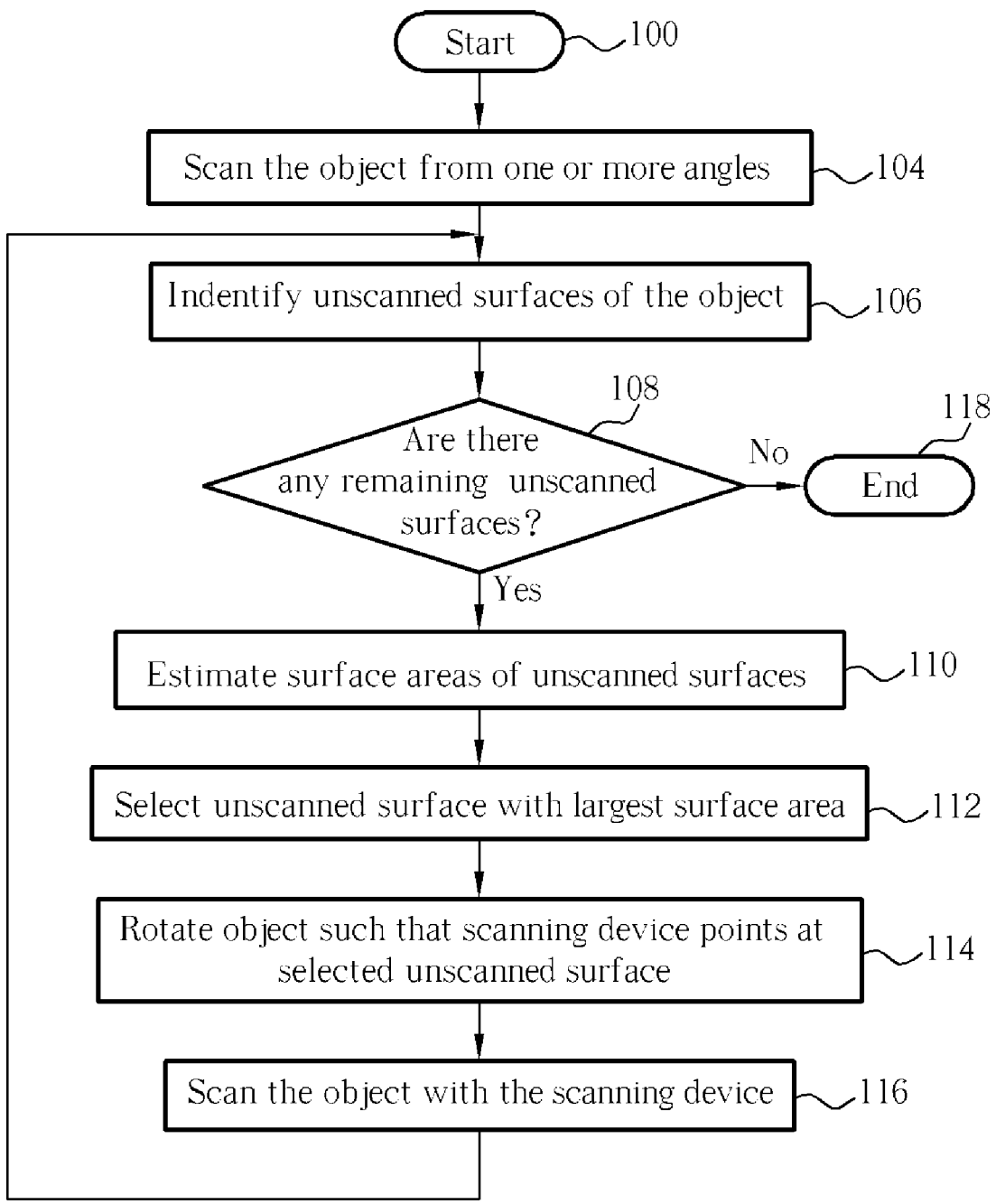
FIG. 6 is a flowchart illustrating a summary of the steps used to efficiently scan the scanned object according to the present invention.

Please refer to FIG. 6. FIG. 6 is a flowchart illustrating a summary of the steps used to efficiently scan the scanned object 10 according to the present invention. Steps contained in the flowchart will be explained below.

Step 100: Start.

Step 104: The scanned object 10 is scanned at least once initially to create an initial image of the scanned object 10. One or more additional initial scanning operations can also be performed according to the shape of the scanned object 10.

Step 106: Identify the unscanned surfaces of the scanned object 10.

Step 108: Determine if there are any remaining unscanned surfaces of the scanned object 10. If so, go to step 110. If not, go to step 118.

Step 110: Estimate the surface areas of the unscanned surfaces.

Step 112: Select the unscanned surface having the largest surface area. If there are two or more unscanned surfaces having the same surface area and this surface area is the largest surface area, then the volumes of blocks that respectively enclose these surfaces are compared. The unscanned surface having the corresponding block with the largest volume is then selected to be the unscanned surface with the largest surface area, and is therefore scanned next.

Step 114: Rotate the scanned object 10 such that the scanning device 12 points towards the midpoint 55m of the block 55 corresponding to the largest unscanned surface S1', as explained with respect to FIG. 5.

Step 116: Scan the scanned object 10 again. Go back to step 106.

Step 118: End.

In summary, the present invention method selects the unscanned surface with the largest surface area to scan first for minimizing the number scanning operations required for fully scanning and measuring the scanned object. By focusing on the unscanned surfaces with the largest surface areas, redundant scanning operations can be eliminated. Moreover, the present invention method is simple to implement and ensures that the scanned object is scanned quickly and efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of scanning and measuring surfaces of a three-dimensional object, the method comprising:
   (a) scanning the object from one or more different angles with a scanning device;
   (b) identifying unscanned surfaces of the object that have not yet been scanned by the scanning device;
   (c) estimating surface areas of the unscanned surfaces;
   (d) comparing the surface areas of the unscanned surfaces for selecting an unscanned surface having the largest surface area;
   (e) rotating the object with respect to the scanning device such that the scanning device is pointing towards the unscanned surface with the largest surface area;
   (f) scanning the object with the scanning device for scanning the unscanned surface with the largest surface area; and
   (g) repeating steps (b) to (f) until all required surfaces of the object have been scanned.

2. The method of claim 1 further comprising:
   creating a three-dimensional block encompassing the unscanned surface with the largest surface area;
   selecting a point on the three-dimensional block; and
   rotating the object with respect to the scanning device such that the scanning device points towards the selected point.

3. The method of claim 2, wherein the three-dimensional block encompassing the unscanned surface with the largest surface area is created such that the volume of the three-dimensional block is minimized.

4. The method of claim 3, wherein in step (d), when more than one surface have the same surface area and the surface area is the largest surface area of the unscanned surfaces, the method further comprises comparing the three-dimensional blocks corresponding to the multiple unscanned surfaces and selecting the unscanned surface for which the corresponding three-dimensional block has the largest volume.

5. The method of claim 2, wherein the selected point is approximately at the center of the three-dimensional block.

6. The method of claim 2, further comprising dividing the three-dimensional block into two equal parts, and rotating the object in the direction of the part containing the divided unscanned surface with the larger surface area.

* * * * *